United States Patent [19]
Erickson et al.

[11] Patent Number: 6,041,048
[45] Date of Patent: Mar. 21, 2000

[54] METHOD FOR PROVIDING INFORMATION PACKETS FROM A PACKET SWITCHING NETWORK TO A BASE SITE AND CORRESPONDING COMMUNICATION SYSTEM

[75] Inventors: Paul M. Erickson, Palatine; Timothy J. Spets, Algonquin, both of Ill.

[73] Assignee: Motorola, Inc., Schaumburg, Ill.

[21] Appl. No.: 09/096,635

[22] Filed: Jun. 12, 1998

[51] Int. Cl.[7] .................................. H04J 3/24; H04Q 7/00
[52] U.S. Cl. ............................................. 370/349; 370/328
[58] Field of Search .................................. 370/328, 329, 370/330, 389, 394, 349; 455/422, 500, 524, 525

[56] References Cited

U.S. PATENT DOCUMENTS

| | | | |
|---|---|---|---|
| 5,416,770 | 5/1995 | Stoner | 370/328 |
| 5,617,417 | 4/1997 | Sathe | 370/194 |

Primary Examiner—Ajit Patel
Assistant Examiner—Ricardo M. Pizarro
Attorney, Agent, or Firm—Daniel C. Crilly; Jeffrey K. Jacobs

[57] ABSTRACT

A multi-service communication system (100) includes a packet switching network (101) and a base site (108). The packet switching network supports multiple communication services, such as voice and data. A communication link (102) having a bandwidth substantially equal to an aggregate bandwidth of radio communication resources (115–116) supported by the base site is provided between the packet switching network and the base site. Attributes of a first communication service are compared and contrasted with attributes or characteristics of a second communication service with respect to the criticality of the attributes and/or characteristics. When one attribute of the first communication service is more critical than an attribute or characteristic of the second communication service, one or more of the attributes and/or characteristics of the second communication service are modified based on the critical attribute of the first communication service. Consequently, when the packet switching network receives information packets from one or more information sources (104, 118), the packet switching network conveys such information packets to the base site via the communication link based on the critical attribute of the first communication service.

16 Claims, 6 Drawing Sheets

METHOD FOR PROVIDING INFORMATION PACKETS FROM A PACKET SWITCHING NETWORK TO A BASE SITE AND CORRESPONDING COMMUNICATION SYSTEM

FIELD OF THE INVENTION

The present invention relates generally to communication systems and, in particular, to a method and apparatus for providing information packets from a packet switching network to a base site in a multi-service communication system.

BACKGROUND OF THE INVENTION

Wireless radio communication systems are well known in the art. Such systems include cellular telephone systems, trunked dispatch systems, and mobile data systems. Early radio systems generally offered a single service. However, some current systems now offer multiple services, such as telephony and trunked dispatch services, on a common set of radio communication resources. One such system is described in U.S. Pat. No. 5,548,631 (hereinafter the '631 patent).

Radio systems which initially offered multiple services provided such services by using a single system controller that coordinated the usage of all radio communication resources and the call processing of all calls. Such coordination has been centralized for all sites, as in the "SmartNet" system that is commercially available from Motorola, Inc. of Schaumburg, Ill., and distributed with one controller for the radio communication resources for each site and another central controller to maintain control over all call processing, as in systems that implement the Global System for Mobile Communications (GSM) standard. Central coordination of call processing leads to an increased complexity of the central controller, in one part due to the different nature of the calls of each service and in another part due to the differing market maturity of each service.

As an alternative approach to distributed control, the '631 patent describes a technique in which the call control is implemented separately in various controllers, or servers, with little concern over the interaction between services. As described in the patent, the radio communication resources are maintained by a control process at the site that arbitrates between conflicting requests from the various servers.

However, another interaction between services is of concern in the system described in the '631 patent because the system described in the patent includes a plurality of base sites. In a radio communication system that includes a plurality of base sites, there must be communication links between the centralized equipment and all the sites that are not collocated with the centralized equipment.

The communication links are generally provided by a public utility company (e.g., telephone company) and, therefore, generally involve a recurring cost. Thus, it is advantageous to minimize the needed bandwidth between the centralized equipment and each of the remote sites, thereby reducing the bandwidth required of each communication link. However, the bandwidth required for each of the services is not known apriori, except that it is limited by the available radio frequency (RF) bandwidth provided by the installed equipment at each of the base sites. Therefore, at any point in time, each service is independently limited by the available RF bandwidth and the aggregate bandwidth of the services is also limited to that same RF bandwidth. In such a situation, one service could use most or all of the RF bandwidth at one time and another service could use most or all of the RF bandwidth at another time.

Since the aggregate bandwidth of the services is limited, an effective method of providing the switching and transportation needs between the servers and the base sites is to use a common packet switching network and a shared communication link between each base site and the centralized communication equipment. However, the characteristics and attributes of each of the services may be such that when applied to a shared communication link, they conflict in such a way as to render one or more of the services unacceptable.

For example, audio delay in a telephony or trunked dispatch voice communication system conflicts with packet data systems in the following way. Audio delay in telephony and trunked dispatch voice communication systems is very critical because users find voice services difficult to use when audio delay is above a couple hundred milliseconds (and only a small portion of this delay would be attributable to the packet switch and transport). On the other hand, packet data systems often transport very large packets (on the order of thousands of bytes of information). Assuming a shared link of 64 kilobits per second (typically referred to within the telephony environment as a single DSO), a data packet with 8,000 bytes of information (64 kilobits) would take a full second to transport on the shared link and would, therefore, delay any voice packets that happened to arrive after the start of the data packet transmission by up to one second. Such a delay would render the voice packets so late as to be unusable and, therefore, severely impair the voice service.

Another approach to adding a new service, such as data, to an existing service, such as telephony, in a multi-site communication system is provide separate links and switches for each service. Such is the approach used to implement cellular digital packet data (CDPD) in existing Advanced Mobile Phone Service (AMPS) systems. However, such an approach is costly due to the requirement of having multiple switches and communication links.

Therefore, a need exists for a multi-service communication system and method for providing information packets from a multiple server packet switching network to a base site in such a communication system that minimizes the bandwidth needed between the packet switching network and the base site and provides an acceptable transport quality to each of the services.

DESCRIPTION OF A PREFERRED EMBODIMENT

Generally, the present invention encompasses a multi-service communication system and a method for providing information packets from a packet switching network to a base site therein. The packet switching network supports multiple communication services, such as voice and data. A communication link having a bandwidth that is substantially equal to an aggregate bandwidth of radio communication resources supported by the base site is provided between the packet switching network and the base site. At least one attribute of a first communication service supported by the packet switching network and at least one attribute or characteristic of a second communication service supported by the packet switching network are determined during a system design phase. Certain attributes of the first communication service are then compared and contrasted with certain attributes or characteristics of the second communication service with respect to the criticality of the attributes and/or characteristics.

When one attribute of the first communication service is more critical than an attribute or characteristic of the second communication service, one or more of the attributes and/or characteristics of the second communication service are modified based on the critical attribute of the first communication service. Consequently, when the packet switching network receives information packets from one or more information sources, the packet switching network conveys such information packets to the base site via the communication link based on the critical attribute of the first communication service. By providing information packets from the packet switching network to a base site in this manner, the present invention allows a communication system to support multiple communication services with appropriate grades of service, without requiring multiple communication links between the packet switching network and the base site, thereby minimizing the necessary bandwidth utilized between the packet switching network and the base site.

Figure 1:
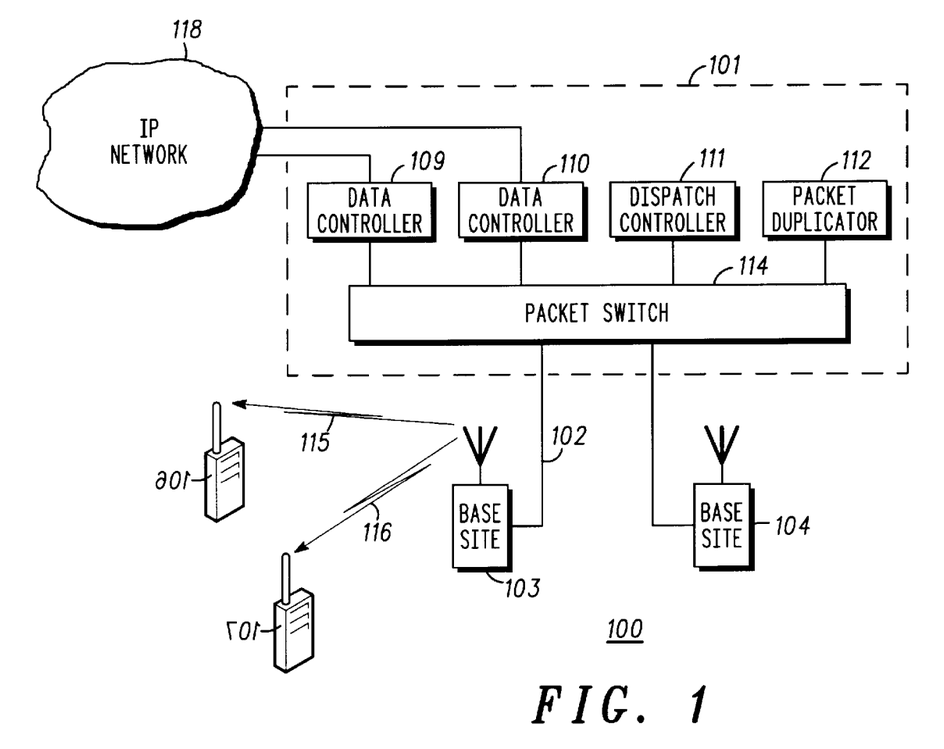
FIG. 1 illustrates a block diagram depiction of a multi-service, radio communication system in accordance with a preferred embodiment of the present invention.

The present invention can be more fully understood with reference to FIGS. 1–7. FIG. 1 illustrates a block diagram depiction of a multi-service, radio communication system 100 in accordance with a preferred embodiment of the present invention. The preferred radio communication system 100 includes a packet switching network 101, at least one base site 103–104 (two shown), a communication link 102 coupling the packet switching network 101 to a base site (e.g., 103), and one or more remote radio communication devices 106–107 (two shown). The base site 103 supports one or more radio communication resources 115–116 (two shown) to permit the exchange of information packets between the packet switching network 101 and the radio communication devices 106–107. As contemplated by the present invention, a radio communication resource might comprise a radio frequency (RF) channel in a frequency division multiple access (FDMA) system, a time slot on an RF channel in a time division multiple access (TDMA) system, or an orthogonal code, such as a pseudo-noise sequence or a frequency-hopping pattern in a code division multiple access (CDMA) system. The communication link 102 preferably comprises a known T1 link that is configured to support a frame relay data link layer protocol and have a transmission bandwidth substantially equal to (i.e., within 5% of) the aggregate bandwidth of radio communication resources 115–116 supported by the base site 103. However, in an alternative embodiment, the communication link 102 might comprise a data communications link, such as T1 or V.35, that is configured to support some other standardized data link protocol, such as X.25 or asynchronous transfer mode (ATM).

The packet switching network 101 includes multiple communication servers and a packet switch 114. In the preferred embodiment, the communication servers include data controllers 109–110, a dispatch controller 111, and a packet duplicator 112. The communication servers 109–112 are connected to the packet switch 114 via appropriate communication links as shown. The data controllers 109–110 are preferably coupled to a data source, such as the Internet Protocol (IP) network 118.

The preferred radio communication system 100 comprises an "iDEN" communication system that is commercially available from Motorola, Inc. of Schaumburg, Ill. Accordingly, the data controllers 109–110 preferably comprise Motorola Data Gateways (MDGs). The dispatch controller 111 preferably comprises an "iDEN" Dispatch Application Processor (DAP) and the packet duplicator 112 preferably comprises an "iDEN" extended site packet duplicator (ESPD). The base sites 103–104 preferably comprise "iDEN" Enhanced Base Transceiver Sites (EBTSs) and the radio communication devices 106–107 preferably comprise "iDEN" portable radios, such as the "iDEN" "i370" radiotelephone and the "iDEN" "i600" radiotelephone. In an alternative embodiment, the radio communication system 100 might comprise any multi-service communication system, such as communication systems that implement one or more of the following cellular platforms: Personal Communication Service (PCS), Unites States Digital Cellular (USDC), Code Division Multiple Access (CDMA), or Global System for Mobile Communications (GSM).

Figure 2:
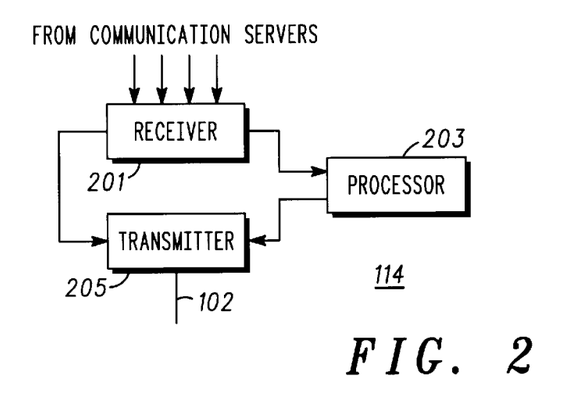
FIG. 2 illustrates a block diagram depiction of a packet switch in accordance with a preferred embodiment of the present invention.

A preferred packet switch 114 is depicted in block diagram form in FIG. 2. The preferred packet switch 114 comprises a receiver 201, a processor 203, and a transmitter 205. The receiver 201, the processor 203, and the transmitter 205 preferably comprise application specific integrated circuits, general purpose processors, and software routines residing on a common platform, such as the IGX platform that is commercially available from Cisco Systems, Inc. of San Jose, Calif.

With reference to FIGS. 1 and 2, operation of the preferred radio communication system 100 occurs substantially as follows in accordance with the present invention. During system design and analysis, a system designer and/ operator configures the communication system 100 to include the communication link 102 between the base site 103 and the packet switching network 101. The communication link 102 is preferably configured to have a bandwidth substantially equal to the aggregate bandwidth of the radio communication resources 115–116 supported by the base site 103. That is, the communication link bandwidth is selected to match the cumulative bandwidth supported by the base site, thereby minimizing cost while optimizing data throughput.

In addition to configuring the communication link 102 as described above, the system designer also determines attributes and/or characteristics of the communication services to be supported by the communication system 100. Such attributes include tolerance to time delay, tolerance to time delay variability, and voice packet reliability (e.g., tolerance to packet loss or bit error rate) for voice service, and reliability for packet data service. Such characteristics include packet rate and packet size for both voice and packet data services.

Upon determining the attributes and/or characteristics of the communication services, the system designer evaluates the attributes and/or characteristics of the services and determines which, if any, of the attributes and/or characteristics are critical to maintaining a minimum quality for the respective service. Once the critical attributes and/or characteristics of each service are determined, the system designer determines whether one attribute and/or characteristic of one of the services is most critical. For example, when the communication services are voice and packet data, tolerance to time delay variability is more critical to voice service than packet size is to packet data service because users of remote communication devices 106–107 are less likely perceive a degradation in packet data service due to packet size reductions than they are to perceive a degradation in voice service due to increased voice delay.

When one attribute and/or characteristic of one service is determined to be more critical than an attribute and/or characteristic of the other services, the system designer modifies the attributes and/or characteristics of the other services based on the critical attribute and/or characteristic of the one service. For example, when tolerance to time delay variability is more critical than data packet size in a voice and data system, the system designer programs the packet switching network 101 to permit a maximum amount of data to be conveyed between the packet switching network 101 and the base site 103 via the communication link 102 during any period of time. Thus, when a data packet is received by the packet switching network 101 from a data source, such as the IP network 118, that contains an amount of data that is less than or equal to the pre-established maximum, the packet switching network 101 conveys the data packet to the base site 103 via the communication link 102. When the data packet received by the packet switching network 101 contains an amount of data that is greater than the pre-established maximum, the packet switching network 101 divides the data packet into data blocks that contain no more than the pre-established maximum amount of data, thereby effectively reducing the packet size which is an attribute of the packet data service.

In addition to programming the packet switching network 101 to divide received data packets into data blocks, the system designer preferably also programs the packet switching network 101 to delay transmission of the data blocks to the base site 103 in such a manner as to substantially equal the data rate of the radio communication resource 115, while minimizing the amount of data to be stored at the base site 103 prior to transmission by effectively providing the packets to the base site 103 at substantially the same rate at which the base site 103 can ultimately transmit the packets via the radio communication resource 115. A further benefit to delaying packet delivery to the base site 103 is a reduction in the congestion on the communication link 102.

Once the system design phase is complete, the information sources (e.g., IP network 118 one or more of the base sites 103–104) begin delivering information packets to the packet switching network 101. Upon receiving the information packets, the packet switching network 101 conveys the packets to the base site 103 via the communication link 102 in accordance with a services-dependent protocol that is based on the critical attribute of one of the services as discussed above. For example, when the packet switching network 101 receives both voice and data packets (i.e., the packet switching network 101 is supporting both voice and data services) respectively at two or more of its communication servers (e.g., data controller 109 and packet duplicator 112), the data server (e.g., data controller 109) divides the data packets into data blocks and provides the data blocks to the packet switch 114 preferably in a delayed manner as described above. By contrast, the voice server (packet duplicator 112) provides the voice packets to the packet switch 114 without introducing any additional delay. It should be noted that in the preferred communication system 100, the dispatch controller 111 provides control signals to the base site 103 to control group voice communications between the remote communication devices 106–107; thus, for the purposes of this invention, the information packets containing control information from the dispatch controller 111 are preferably treated in the same manner as are voice packets received from the packet duplicator 112.

Upon receiving the voice packets and the data blocks from the data server and voice server respectively at its receiver 201, the packet switch 114 employs its processor 203 to determine whether a voice packet or a data block was received first. When a voice packet was received before a data block, the packet switch 114 employs its transmitter 205 to convey all voice packets that have been received by the packet switch 114 to the base site 103 via the communication link 102. When one or more data blocks were received by the packet switch 114 before a voice packet was so received, the packet switch 114 conveys one of the data blocks to the base site 103 via the communication link 102 and then employs its processor 203 to determine if a voice packet has been received. If no voice packet has been received, the packet switch 114 continues sending one data block at a time to the base site 103 until the packet switch 114 receives a voice packet. Once a voice packet is received, the packet switch 114 delays transmission of subsequent data blocks (i.e., queues the subsequent data blocks) until conveyance of the voice packet or packets is completed.

Although as discussed above with respect to a single data server and a single voice server, the present invention is also applicable to the condition in which multiple voice servers and multiple data servers are providing voice packets and data blocks respectively to the packet switch 114 for ultimate delivery to the base site 103.

In an alternative example, when the packet switching network 101 is presently supporting one or more data services and multiple data communication sessions between the packet switching network 101 and the base site 103 have been requested in accordance with known techniques by either the radio communication devices 106–107 or the data sources (e.g., the IP network 118 or another base site 104), the each data server (e.g., data controller 109 and data controller 110) or the packet switch 114 establishes a respective data communication session between the respective data server and the base site 103. In a preferred embodiment, each data communication session is established by assigning a virtual circuit between the respective data server and the base site 103. Once the data communication sessions are established, the each data server receives data packets from a data source and divides the received data packets into data blocks. The data servers then determine anticipated transmission times for their respective data blocks based on the data rates of their respective data communication sessions. For example, when two data communication sessions have been established in a TDMA radio communication system having time slots of 15 milliseconds each, each data block of each data communication session is sized to fit in a time slot and the anticipated transmission times for the data blocks of both communication sessions are at time slot intervals.

Once the anticipated transmission times are determined, the data servers convey their respective data blocks to the packet switch 114 at the anticipated transmission times. Upon receiving one or more data blocks at its receiver 201, the packet switch 114 employs its processor 203 to determine whether or not the communication link 102 is available. When the communication link 102 is available, the packet switch 114 employs its transmitter 205 to convey the data block or blocks to the base site 103 via the communication link 102, thereby effectively providing the data blocks to the base site 103 at their anticipated transmission times. When the communication link 102 is not available (e.g., due to voice traffic on the communication link 102), the packet switch 114 employs its processor 203 to store the received data blocks until the communication link 102 becomes available. Once the communication link 102 becomes available, the processor 203 selects which data blocks to convey via the communication link 102. In the preferred embodiment, the processor 203 selects the stored data blocks for transmission prior to selecting any newly received data blocks because the stored data blocks are those that effectively have expired anticipated transmission times. In an alternative embodiment, the processor 203 might further refine its selection by determining time deadlines for transmission of the stored data blocks. The time deadlines are based upon the quality of service for the particular data service. For example, a data service might include a guaranteed transmission time or might include retransmission timers, such as in the transport control protocol (TCP). Once the time deadlines are determined, the processor 203 selects those stored data blocks having the earliest time deadlines (i.e., smallest time window for delivery) and provides the selected data blocks to the transmitter 205 for conveyance to the base site 103.

As described above, the present invention provides a multiservice communication system in which a single communication link is provided between the packet switching network and the base site with a bandwidth that substantially matches the aggregate usable bandwidth of the base site to facilitate the multiple communication services supported by the communication system. To permit the use of such a communication link, the present invention modifies attributes or characteristics of one or more of the communication services based on a critical attribute of another communication service and provides for the conveyance of information packets associated with all communication services based on the critical attribute of the critical communication service. In addition, the present invention facilitates a single data link protocol between the packet switching network and the base site for all services, even though the packet switching network includes multiple communication servers, thereby enabling the use of a single packet switch for all services, in sharp contrast to existing multi-service systems, such AMPS systems that include CDPD, that use multiple data link protocols and corresponding communication links between the base site and the communication servers.

Figure 3:
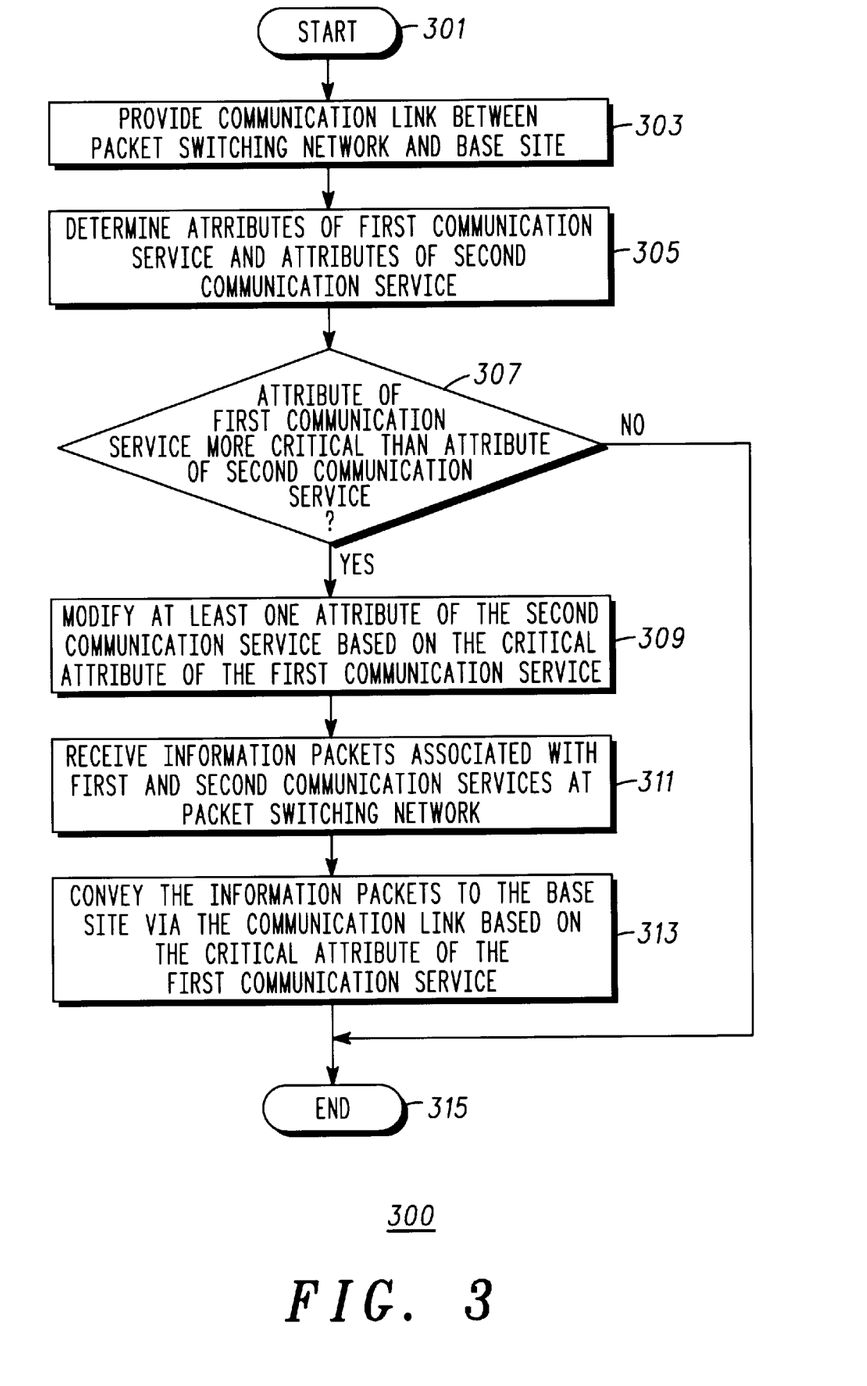
FIG. 3 illustrates a logic flow diagram of steps executed to provide information packets from a packet switching network to a base site in accordance with the present invention.

FIG. 3 illustrates a logic flow diagram 300 of steps executed to provide information packets from a packet switching network to a base site in accordance with the present invention. The logic flow begins (301) when a communication link is provided (303) between a packet switching network and the base site. The communication link has a bandwidth that is substantially equal to an aggregate bandwidth of radio communication resources supported by the base site. During a system design phase, one or more attributes of a first communication service (e.g., voice service) and one or more attributes of a second communication service (e.g., packet data) are determined (305) by a system designer or operator. When the first communication service is voice service, attributes of the first communication service include tolerance to time delay, tolerance to the time delay variability, and voice packet reliability. When the second communication service is packet data, the attributes of the second communication service include reliability.

Once the attributes of the first communication service and the attributes of the second communication service are determined, the system designer determines (307) whether one attribute of the first communication service is more critical to maintaining a minimum quality of service for the first communication service than is an attribute of the second communication service to maintaining a minimum quality of service for the second communication service. When an attribute (e.g., tolerance to time delay variability) of the first communication service is more critical than an attribute (e.g., reliability) of the second communication service, the system designer modifies (309) at least one attribute of the second communication service based on the critical attribute of the first communication service. For example, when tolerance of time delay variability is more critical than data packet reliability, the system designer might program the packet switching network to preempt the transmission of data in favor of the transmission of voice. That is, when data is being transmitted on the communication link and a new voice packet arrives, the packet switching network prematurely terminates the data transmission and begins transmitting the voice packet.

Once the system design is complete, the packet switching network receives (311) information packets associated with the first and second communication services. The information packets may arrive at the packet switching network from one of a variety of sources, such as an IP network or another base site. The packet switching network then conveys (313) the information packets to the base site via the communication link based on a critical attribute of the first communication service and the logic flow ends (315). When an attribute of the first communication service is no more critical than any other attribute of the second communication service (307), no attribute modifications are made and the packet switching network simply conveys any received information packets to the base site via the communication link based on the attribute of the communication service to which the information packets pertain, and the logic flow ends (315).

Figure 4:
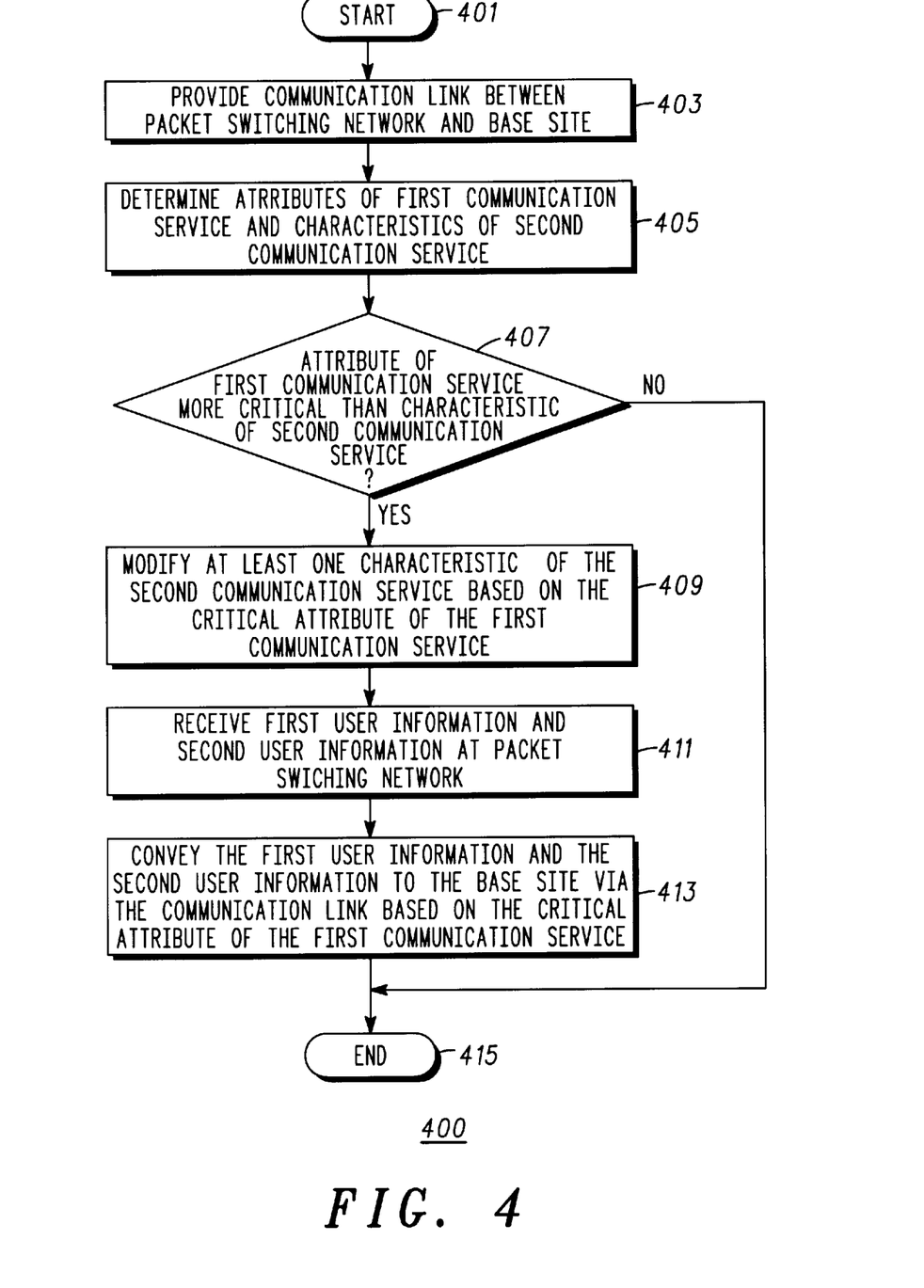
FIG. 4 illustrates a logic flow diagram of steps executed to provide information packets from a packet switching network to a base site in accordance with a preferred embodiment of the present invention.

FIG. 4 illustrates a logic flow diagram 400 of steps executed to provide information packets from a packet switching network to a base site in accordance with a preferred embodiment of the present invention. The logic flow begins (401) when a communication link is provided (403) between a packet switching network and the base site. As noted above, the communication link has a bandwidth that is substantially equal to an aggregate bandwidth of radio communication resources supported by the base site. During a system design phase, one or more attributes of a first communication service (e.g., voice service) and one or more characteristics of a second communication service (e.g., packet data) are determined (405) by a system designer or operator. When the first communication service is voice service, attributes of the first communication service include tolerance to time delay, tolerance to the time delay variability, and voice packet reliability. When the second communication service is packet data, the characteristics of the second communication service include packet size and packet rate.

Once the attributes of the first communication service and the characteristics of the second communication service are determined, the system designer determines (407) whether one attribute of the first communication service is more critical to maintaining a minimum quality of service for the first communication service than is a characteristic of the second communication service to maintaining a minimum quality of service for the second communication service. When an attribute (e.g., tolerance to time delay variability) of the first communication service is more critical than a characteristic (e.g., packet size or packet rate) of the second communication service, the system designer modifies (409) at least one characteristic of the second communication service based on the critical attribute of the first communication service. For example, when tolerance of time delay variability is more critical than packet size, the system designer programs the packet switching network to divide received data packets into blocks (thereby reducing the packet size) and delay transmission of the data blocks as described above.

Once the system design is complete, the packet switching network receives (411) information packets associated with the first and second communication services. The information packets may arrive at the packet switching network from one of a variety of sources, such as an IP network or another base site. The packet switching network then conveys (413) the information packets to the base site via the communication link based on a critical attribute of the first communication service and the logic flow ends (415). When an attribute of the first communication service is no more critical than any characteristic of the second communication service (407), no characteristic modifications are made and the packet switching network simply conveys any received information packets to the base site via the communication link based on the attributes and characteristics of the communication service to which the information packets pertain, and the logic flow ends (415).

Figure 5:
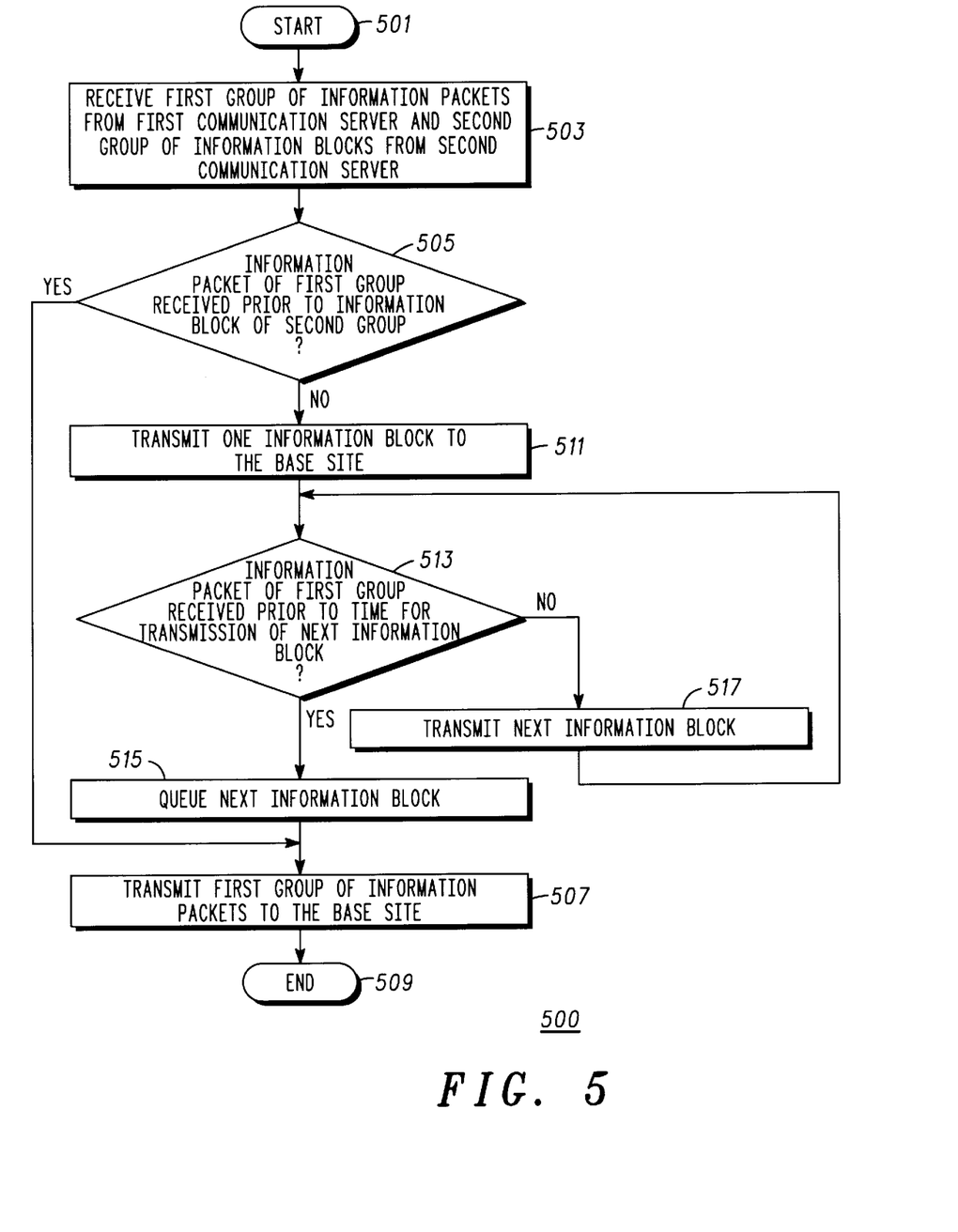
FIG. 5 illustrates a logic flow diagram of steps executed by a packet switch to provide information packets from multiple communication servers to a base site in accordance with a preferred embodiment of the present invention.

FIG. 5 illustrates a logic flow diagram 500 of steps executed by a packet switch to provide information packets from multiple communication servers to a base site in accordance with a preferred embodiment of the present invention. The logic flow begins (501) when the packet switch receives (503) a first group of information packets from a first communication server and a second group of information blocks from a second communication server. Prior to conveying the information blocks to the packet switch, the second communication server divides any data packets larger than a desired block size (e.g., an amount of user data that can be transmitted in one TDMA time slot) into data blocks of the desired block size. Thus, some blocks of the second group of information blocks might constitute individual information packets and some blocks of the second group of information blocks might collectively constitute an information packet. Some blocks of the second group collectively constitute an information packet when the second group includes blocks from multiple information packets (such as when the second communication server has received information packets for multiple remote communication devices), has divided the information packets into data blocks, and is providing data blocks intended for one remote radio communication device together with data blocks intended for another remote radio communication device.

As the information blocks and information packets are received from the communication servers, the packet switch determines (505) whether an information packet of the first group was received prior to an information block of the second group. For example, in the preferred embodiment, the packet switch determines whether a voice packet is received prior to a data block. When an information packet of the first group is received prior to an information block of the second group, the packet switch transmits (507) the first group of information packets of the base site and the logic flow ends (509). In the above example, when the packet switch receives a voice packet prior to receiving a data block, and voice has been determined to have the more critical attribute as discussed above, the packet switch transmits all voice packets received prior to transmitting any data blocks.

When an information packet of the first group is not received prior to an information block of the second group, the packet switch transmits (511) one information block to the base site via the communication link and then determines (513) whether an information packet of the first group has been received prior to a time for transmission of the next information block. That is, in the above example, when a data block is received before any voice packets, the packet switch begins transmitting data blocks one at a time until a voice packet is received. After each transmission of a data block, the packet switch determines whether or not a voice packet has been received. When an information packet of the first group is received prior to the time for transmission of the next information block, the packet switch queues (515) the next information block and transmits (507) the first group of information packets to the base site and the logic flow ends (509). Thus, when a voice packet arrives at the packet switch prior to the time for transmission of the next information block in sequence, the packet switch queues the information block and transmits all voice packets. After all the voice packets are transmitted, the packet switch then begins transmitting the data blocks.

When an information packet of the first group is not received prior to the time for transmission of the next information block, the packet switch transmits (517) the next information block and the logic flow returns to decision block 513 for re-evaluation of whether or not an information packet from the first group (i.e., an information packet from the first communication server) has been received prior to the transmission time of the next information block in sequence. In the preferred embodiment, the packet switch conveys information packets or information blocks to the base site using the prioritization approach described above with respect to FIG. 5 once service priorities are set in the system using the methodologies described above with respect to FIGS. 3 and 4.

Figure 6:
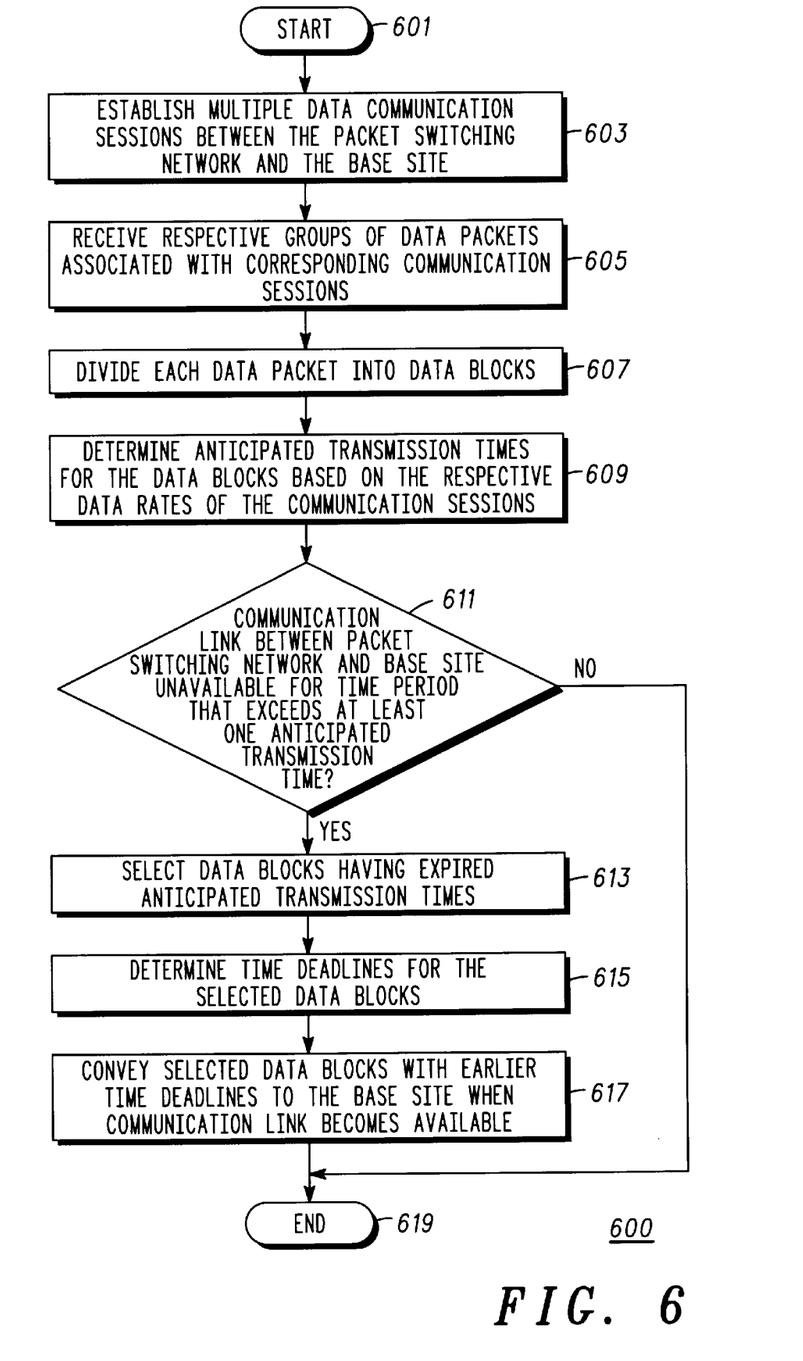
FIG. 6 illustrates a logic flow diagram of steps executed by a packet switching network to provide data packets associated with multiple data communication sessions to a base site in accordance with a preferred embodiment of the present invention.

FIG. 6 illustrates a logic flow diagram 600 of steps executed by a packet switching network to provide data packets associated with multiple data communication sessions to a base site in accordance with a preferred embodiment of the present invention.

The logic flow begins (601) when the packet switching network establishes (603) a first data communication session and a second data communication session between the packet switching network and the base site. The communication sessions are preferably established by assigning a virtual circuits between the packet switching network and the base site. Once the data communication sessions are established, the packet switching network receives (605) a first group of data packets associated with the first data communication session and a second group of data packets associated with the second data communication session from one or more data sources, such as an IP network or another base site. Routing of data packets between the data sources and the packet switching network is well known; thus, further discussion will be provided except to facilitate an understanding of the present invention.

Upon receiving the data packets associated with each data communication session, the packet switching network divides (607) each data packet into data blocks. The packet switching network then determines (609) an anticipated transmission time for each data block based on the respective data rate of the communication session to which each data block is associated. That is, the packet switching network determines anticipated transmission times for the data blocks associated with the first group of data packets based on the data rate for the first communication session and determines anticipated transmission times for the data blocks associated with the second communication session based on the data rate of the second communication session.

Once the anticipated transmission times are determined, the packet switching network determines (611) whether the communication link between the packet switching network and the base site is unavailable for a time period that exceeds at least one anticipated transmission time of a data block. That is, the packet switching network determines whether the communication link was available at each anticipated transmission time of a data block. When the communication link was not available for a time period that exceeded one or more anticipated transmission times of data blocks, the packet switching network selects (613) those data blocks having expired transmission times for subsequent conveyance to the base site.

In the preferred embodiment, the packet switching network performs another level of prioritization by determining (615) time deadlines for the selected data blocks having expired anticipated transmission times. In the preferred embodiment, each data packet has a time stamp associated with it. Thus each data block formed from a data packet also has a time stamp associated with it. Based on the quality of service of the particular data communication session, a time deadline for transmission of a data block can be determined based on the quality of service parameters of the data communication session. The quality of service parameters establish the time delay that can be incurred between reception and transmission of data blocks. Therefore, depending upon the quality of service for the respective data communication session, the data blocks associated with that session must be conveyed by the packet switching network to the base site by certain time deadlines or, if not so conveyed, must be deleted. Consequently, time deadlines are preferably determined in block 615 based on the quality of service parameters of the communication session.

In the preferred embodiment, the packet switching network then conveys (617) the selected data blocks with earlier time deadlines to the base site once the communication link becomes available, and the logic flow ends (619). When the communication link between the packet switching network and the base site has not been unavailable for a time period that exceeds at least one anticipated transmission time of a data block (611), the packet switching network simply conveys the data blocks to the base site at their anticipated transmission times and the logic flow ends (619). Thus, as described above, the present invention uses a multi-level prioritization approach for conveying data blocks from the packet switching network to the base site when multiple data communication sessions are being processed by the packet switching network simultaneously. The two levels of the prioritization process include transmitting data blocks with expired anticipated transmission times prior to data blocks having anticipated transmission times that have not yet expired and selecting among the data blocks with expired anticipated transmission times based on time deadlines of those particular data blocks. In an alternative embodiment, the packet switching network might use only a single tiered prioritization scheme in which the packet switching network conveys data blocks having expired anticipated transmission times to the base site, without also considering the time deadlines associated with those data blocks.

Figure 7:
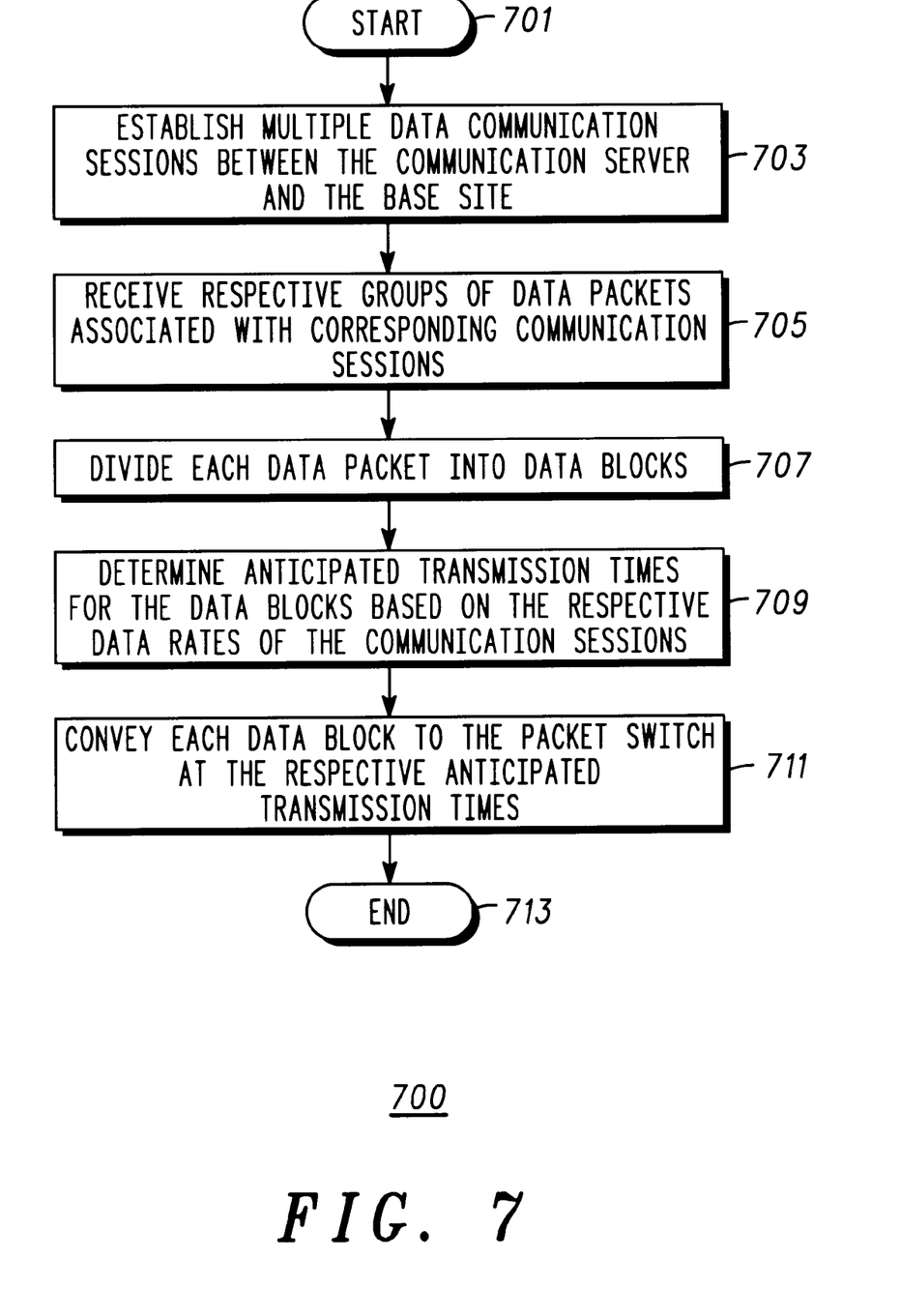
FIG. 7 illustrates a logic flow diagram of steps executed by a communication server to provide data packets associated with multiple data communication sessions to a packet switch in accordance with a preferred embodiment of the present invention.

FIG. 7 illustrates a logic flow diagram 700 of steps executed by a communication server to provide data packets associated with multiple data communication sessions to a packet switch in accordance with a preferred embodiment of the present invention. The logic flow begins (701) when the communication server establishes (703) multiple data communication sessions between the communication server and the base site. The data communication sessions are preferably established by assigning virtual circuits between the communication server and the base site. Upon establishing the data communication sessions, the communication server receives (705) a first group of data packets associated with a first data communication session and a second group of data packets associated with a second data communication session from one or more data sources. The communication server then divides (707) each data packet of each group of data packets into data blocks.

Once the data blocks are formed, the communication server determines (709) the anticipated transmission times for the data blocks based on the effective data rates of the communication sessions. Finally, the communication server conveys (711) each data block to the packet switch at the respective anticipated transmission times and the logic flow ends (713).

The present invention encompasses a multi-service communication system and a method for providing information packets from a packet switching network to a base site therein. With such an invention, a single communication link can be provided between the packet switching network and the base site with a bandwidth that substantially matches the aggregate usable bandwidth of the base site to facilitate multiple communication services supported by the communication system. To permit the use of such a communication link, the present invention modifies attributes or characteristics of one or more of the communication services based on a critical attribute of another communication service and provides for the conveyance of information packets associated with all communication services based on the critical attribute of the critical communication service.

While the present invention has been particularly shown and described with reference to particular embodiments thereof, it will be understood by those skilled in the art that various changes in form and details may be made therein without departing from the spirit and scope of the present invention.

We claim:

1. In a communication system that includes a packet switching network and a base site, the packet switching network supporting a plurality of communication services, a method for providing information packets associated with a first communication service and information packets associated with a second communication service to the base site, the method comprising the steps of:

providing a communication link between the packet switching network and the base site, wherein the communication link has a bandwidth that is substantially equal to an aggregate bandwidth of radio communication resources supported by the base site;

determining at least one attribute of the first communication service and at least one characteristic of the second communication service;

determining that a first attribute of the first communication service is more critical than the at least one characteristic of the second communication service;

modifying the at least one characteristic of the second communication service based on the first attribute of the first communication service to produce at least one modified characteristic;

conveying, via the communication link, the information packets associated with the first communication service and the information packets associated with the second communication service to the base site based on the first attribute of the first communication service;

wherein the first communication service comprises voice service and wherein the first attribute of the first communication service comprises tolerance to time delay variability;

wherein the second communication service comprises packet data and wherein the at least one characteristic of the second communication service comprises packet size and packet rate;

wherein the information packets associated with the second communication service comprise a group of data packets and wherein the step of modifying comprises the steps of:

dividing each data packet of the group of data packets into a respective plurality of data blocks; and delaying at least one data block of the respective plurality of data blocks to thereby reduce the packet rate.

2. The method of claim 1, wherein the packet switching network includes a packet switch, a first communication server supporting the first communication service, and a second communication server supporting the second communication service, and wherein the information packets associated with the first communication service comprise a group of voice packets and wherein the step of conveying comprises the steps of:

determining, by the packet switch, whether at least one voice packet of the group of voice packets arrives at the packet switch from the first communication server prior to at least one data block of the respective plurality of data blocks arriving at the packet switch from the second communication server; and transmitting, by the packet switch, the group of voice packets when at least one voice packet of the group of voice packets arrives at the packet switch prior to at least one data block of the respective plurality of data blocks.

3. The method of claim 2, wherein the step of conveying further comprises the steps of:

when at least one voice packet of the group of voice packets does not arrive at the packet switch prior to at least one data block of the respective plurality of data blocks, transmitting, by the packet switch, a first data block of the at least one data block;

determining, by the packet switch, whether at least one voice packet of the group of voice packets has arrived at the packet switch prior to a time for transmission of a second data block of the at least one data block;

when at least one voice packet of the group of voice packets has arrived at the packet switch prior to the time for transmission of the second data block of the at least one data block, transmitting, by the packet switch, the group of voice packets; and queuing, by the packet switch, at least the second data block; and when at least one voice packet of the group of voice packets has not arrived at the packet switch prior to the time for transmission of the second data block of the at least one data block, transmitting, by the packet switch, the second data block.

4. The method of claim 1, wherein the at least one attribute of the first communication service comprises voice packet reliability and tolerance to time delay variability.

5. In a communication system that includes a packet switch, a first communication server supporting a first communication service, a second communication server supporting a second communication service, and a base site, a method for the packet switch to provide information packets associated with the first communication service and information packets associated with the second communication service to the base site, the method comprising the steps of:

receiving a first group of information packets from the first communication server and a second group of information blocks from the second communication server, wherein a plurality of information blocks of the second group of information blocks constitute an information packet;

determining whether at least one information packet of the first group of information packets was received prior to at least one information block of the second group of information blocks;

when at least one information packet of the first group of information packets was received prior to at least one information block of the second group of information blocks, transmitting the first group of information packets to the base site via a communication link, wherein the communication link has a bandwidth that is substantially equal to an aggregate bandwidth of radio communication resources supported by the base site;

when at least one information packet of the first group of information packets was not received prior to at least one information block of the second group of information blocks, transmitting a first information block of the at least one information block to the base site via the communication link;

determining whether at least one information packet of the first group of information packets was received prior to a time for transmission of a second information block of the at least one information block;

when at least one information packet of the first group of information packets was received prior to the time for transmission of the second information block of the at least one information block, transmitting the first group of information packets to the base site via the communication link; and queuing at least the second information block; and when at least one information packet of the first group of information packets was not received prior to the time for transmission of the second information block of the at least one information block, transmitting the second information block to the base site via the communication link.

6. The method of claim 5, wherein the first group of information packets comprises a group of voice packets and wherein the second group of information blocks comprises a group of data blocks.

7. In a communication system that includes a packet switching network and a base site, the packet switching network supporting at least one data communication service, a method for the packet switching network to provide data information to the base site, the method comprising the steps of:

establishing a first data communication session and a second data communication session between the packet switching network and the base site;

receiving a first group of data packets associated with the first data communication session and a second group of data packets associated with the second data communication session from at least one data source;

dividing each data packet of the first group of data packets into a first plurality of data blocks and each data packet of the second group of data packets into a second plurality of data blocks;

determining an anticipated transmission time for each data block of the first plurality of data blocks based on a data rate of the first data communication session and an anticipated transmission time for each data block of the second plurality of data blocks based on a data rate of the second data communication session to produce a plurality of anticipated transmission times;

determining that a communication link between the packet switching network and the base site is unavailable for a time period that exceeds at least one anticipated transmission time of the plurality of anticipated transmission times, wherein the communication link has a bandwidth that is substantially equal to an aggregate bandwidth of radio communication resources supported by the base site;

selecting data blocks of the first plurality of data blocks and the second plurality of data blocks that have anticipated transmission times that have expired to produce selected data blocks; and conveying, via the communication link, at least one selected data block of the selected data blocks to the base site when the communication link becomes available.

8. The method of claim 7, wherein the step of selecting further comprises the steps of:

determining time deadlines for transmission of the selected data blocks; and selecting a selected data block associated with an earliest time deadline as the at least one selected data block.

9. In a communication system that includes a packet switch, at least one communication server supporting data communication service, and a base site, a method for the at least one communication server to provide data information to the packet switch, the method comprising the steps of:

establishing a first data communication session and a second data communication session between the at least one communication server and the base site;

receiving a first group of data packets associated with the first data communication session and a second group of data packets associated with the second data communication session from at least one data source;

dividing each data packet of the first group of data packets into a first plurality of data blocks and each data packet of the second group of data packets into a second plurality of data blocks;

determining an anticipated transmission time for each data block of the first plurality of data blocks based on a data rate of the first data communication session and an anticipated transmission time for each data block of the second plurality of data blocks based on a data rate of the second data communication session to produce a plurality of anticipated transmission times; and conveying each data block of the first plurality of data blocks and each data block of the second plurality of data blocks to the packet switch at respective anticipated transmission times.

10. A communication system comprising:

a first communication server supporting a first communication service;

a second communication server supporting a second communication service;

a base site supporting radio communication resources that provide the first communication service and the second communication service to remote radio communication devices;

a communication link, coupled at a first end to the base site, having a bandwidth that is substantially equal to an aggregate bandwidth of the radio communication resources supported by the base site; and a packet switch, coupled to the first communication server and the second communication server, that includes:

a receiver that receives a first group of information packets from the first communication server and a second group of information blocks from the second communication server, wherein a plurality of information blocks of the second group of information blocks constitute an information packet;

a processor, coupled to the receiver, that determines whether at least one information packet of the first group of information packets was received prior to at least one information block of a respective plurality of information blocks and that determines whether at least one information packet of the first group of information packets was received prior to a time for transmission of a second information block of the at least one information block; and a transmitter, coupled to the processor, the receiver, and a second end of the communication link, that transmits the first group of information packets to the base site via the communication link when at least one information packet of the first group of information packets was received prior to at least one information block of a respective plurality of information blocks, that transmits a first information block of the at least one information block to the base site via the communication link when at least one information packet of the first group of information packets was not received prior to at least one information block of a respective plurality of information blocks, that transmits the first group of information packets to the base site via the communication link when at least one information packet of the first group of information packets was received prior to a time for transmission of a second information block of the at least one information block, and that transmits the second information block to the base site via the communication link when at least one information packet of the first group of information packets was not received prior to the time for transmission of the second information block of the at least one information block.

11. The communication system of claim 10, wherein the communication link is a T1 link that supports a frame relay data link layer protocol.

12. The communication system of claim 10, wherein the first communication server comprises a dispatch controller.

13. The communication system of claim 10, wherein the first communication server comprises a packet duplicator.

14. The communication system of claim 10, wherein the second communication server comprises a data controller.

15. The method of claim 1, wherein the at least one characteristic of the second communication service further comprises reliability.

16. The method of claim 1, wherein the communication link is a T1 link that supports a frame relay data link layer protocol.

* * * * *